Figure 3:
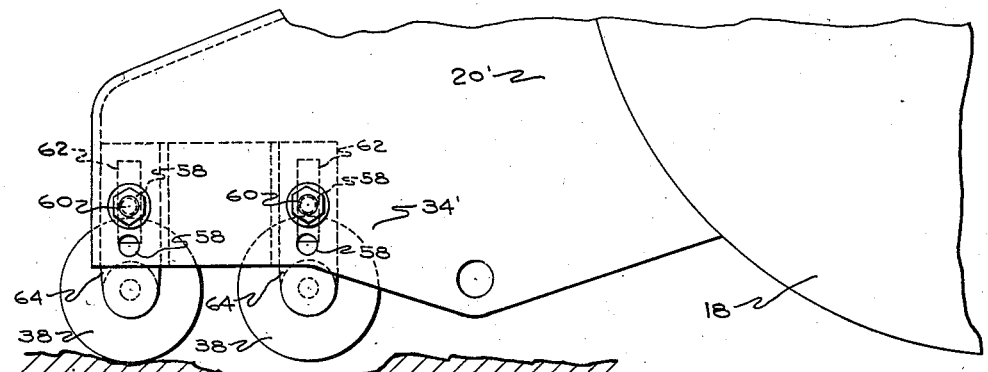

July 22, 1941.　　　T. B. FUNK　　　2,250,418
POWER LAWN MOWER
Filed June 10, 1939　　　2 Sheets-Sheet 1
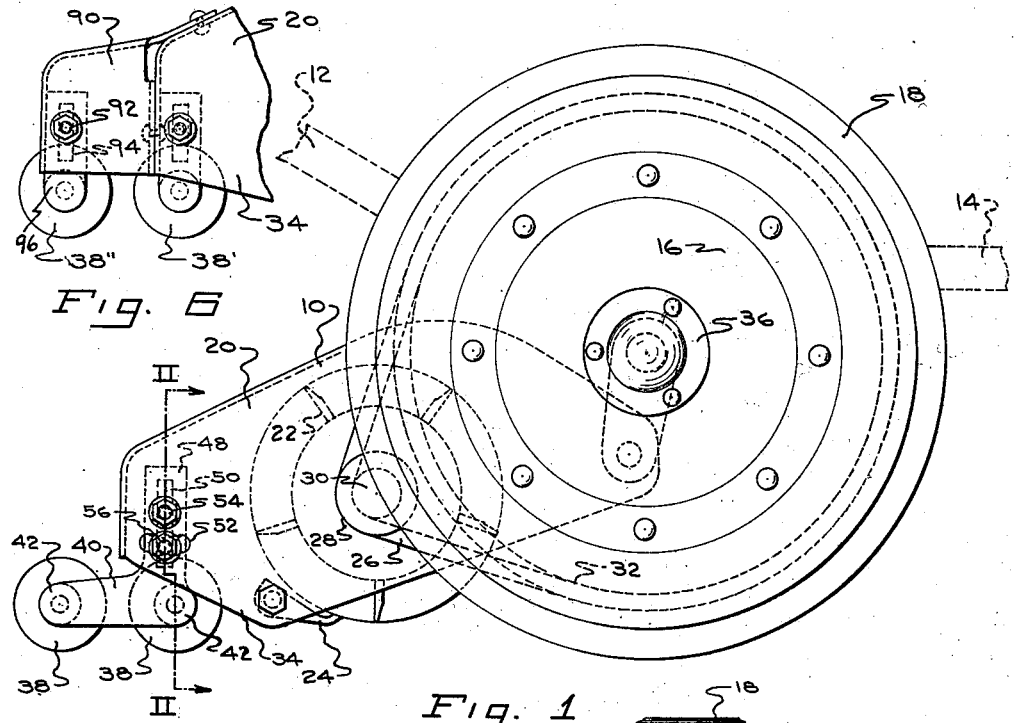
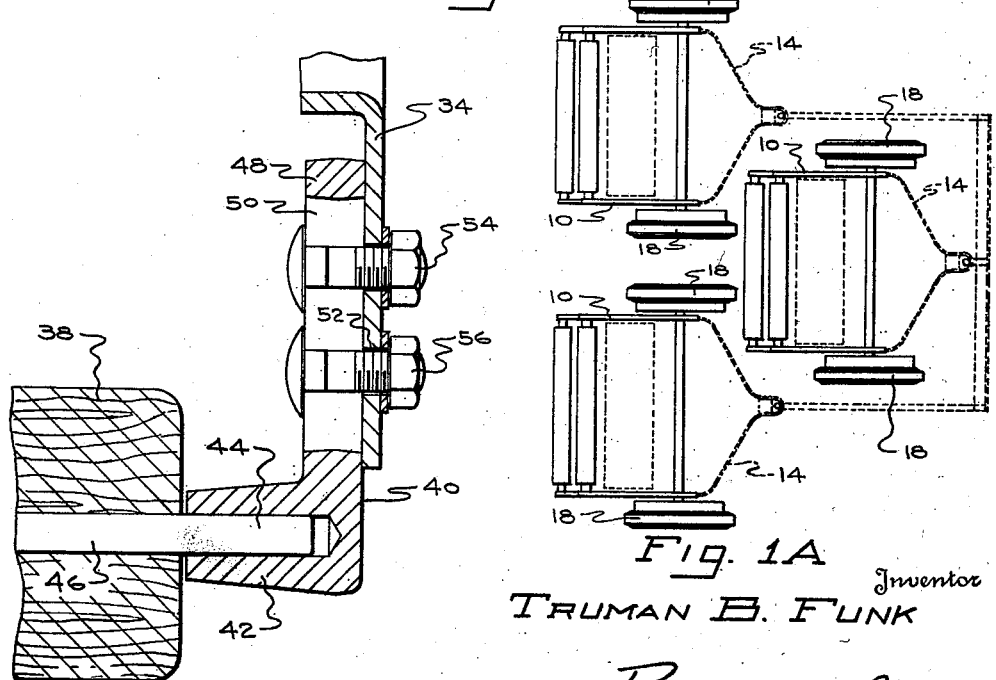
Inventor
TRUMAN B. FUNK
By Beaman & Langford
Attorneys July 22, 1941.　　　T. B. FUNK　　　2,250,418
POWER LAWN MOWER
Filed June 10, 1939　　　2 Sheets-Sheet 2

Inventor
TRUMAN B. FUNK
By Beaman & Langford
Attorneys

Patented July 22, 1941

2,250,418

UNITED STATES PATENT OFFICE 2,250,418

POWER LAWN MOWER

Truman B. Funk, Jackson, Mich., assignor to "Yard-Man," Inc., Jackson, Mich., a corporation of Michigan Application June 10, 1939, Serial No. 278,391

6 Claims. (Cl. 56—249)

The present invention relates to improvements in lawn mowers having particular reference to motorized equipment such as that used in the care of parks, golf courses and large estates in multiple units as well as motor driven manually guided lawn mowers.

At the present time the high speed at which the mower unit of motorized equipment may be operated over the ground and give satisfactory performance is approximately six miles per hour. With existing mower design, at higher speeds, there is a tendency for the part or parts determining the height of cut to vibrate or bound up and down and fail to follow the ground contour due to ground irregularity. This vibration, out-of-phase with the ground contour, produces a wavy cut and in time will actually impart a similar wavy contour to the ground itself. In the case of golf course fairways, this is particularly true and very objectionable. It should be obvious that higher moving speeds are desirable if this difficulty could be eliminated.

According to the present invention, I propose to improve the ground roller structure of the mower unit in a manner that it will dampen the aforesaid vibrating tendency by smoothing out, in effect, ground irregularities. The arrangement for accomplishing this result as appears from the several forms herein illustrated comprises a plurality of ground rollers in spaced relation in the direction of travel and so mounted as to enable equal performance throughout the range of cutting height effected through adjustment of the ground roller structure.

Thus one of the objects of the present invention is to provide dampening and smoothing out mechanism for the mower unit of motorized lawn mower construction to enable higher ground speed operation.

Another object is to provide improved ground roller structure for lawn mowers functioning to regulate the height of cut above the ground which is capable of increasing the ground speed at which the mower may be satisfactorily operated.

Another object is to provide improved ground roller structure for lawn mowers comprising two or more rollers in spaced relation for dampening or smoothing the action of the associated structure due to ground irregularities.

A further object is to provide an improved mechanism for controlling the height of cut in lawn mowers which comprises two or more ground contacting members in spaced relation in the direction of travel of the mower, said member being supported from a common framework and supporting said framework relative to the ground collectively as well as individually at spaced points in the direction of mower travel.

A still further object resides in providing novel ground roller structure for motorized or power operated lawn mowers comprising a plurality of rollers capable of being adjusted so as to be positionable in a common operating plane paralleling the ground in all positions of adjustment regulating the cutting height.

A still further object of the invention resides in providing improved structure for lawn mowers for controlling the cutting height comprising ground contacting members spaced in the direction of mower travel and engaging with the ground in a common operating plane.

These and other objects and advantages residing in details of construction, arrangement and combination of structural elements will be apparent from a consideration of the description of the several forms of the invention illustrated in the drawings. The nature and scope of the invention is defined in the annexed claims.

In the drawings—

Fig. 1 is a side elevational view of a mower unit embodying the present invention, Fig. 1A is a plan view of multiple mower units with a common hitch, Fig. 2 is a vertical cross-sectional view taken on line II—II of Fig. 1, Figs. 3, 4 and 5 are fragmentary side elevational views similar to Fig. 1, showing different forms of the present invention, and Fig. 6 shows a further modification of the invention in which an adapter bracket carrying an additional ground roller is provided for attachment to standard lawn mower chassis.

In Figs. 1 and 1A of the drawings, I have illustrated the principles of the present invention in connection with lawn mower unit 10 which may be of any well known construction having a wheeled chassis or its equivalent, a tiltable cutter chassis supported therefrom and adapted to have its height of cut controlled through a ground contacting element. The unit 10 may be individually powered and manually guided over the ground through a handle indicated at 12 in broken line or it may be propelled over the ground alone or in multiple by a suitable tractor through a suitable hitch indicated in broken line at 14. At the present, it is anticipated that the principles of the invention are adaptable to multiple units as shown in Fig. 1A which are drawn at a relatively high rate of speed by a tractor, and used in connection with the care of large lawns, parks and golf courses.

The wheeled chassis 16 of the unit 10 includes the ground wheels 18 supported for rotation and held in spaced relation in any well known manner. The cutter chassis 20 carries the cutting mechanism which in the illustration of Fig. 1 comprises a cutting reel 22 and a cutter bar 24. The reel 22 is shown driven in one of several conventional manners, namely, through belts 26 running over pulleys 28 on the reel shaft 30 and sheaves 32 driven by the wheels 18. The side plates 34 of the cutter chassis support the cutting reel 22 and bar 24 for pivotal movement about the axis 36 of the wheels 18. The foregoing structure is all well known and forms no part of the present invention by itself.

In lieu of the usual adjustable ground roller for regulating and controlling the height of cut, I propose to use two or more ground contacting members which may take numerous shapes and forms. Preferably this member will be of rotating character to reduce drag, as for example, wooden rollers of uniform shape throughout their length as illustrated. Referring to Figs. 1 and 2, a pair of ground rollers 38 are shown supported in spaced relation in adjustable hangers 40 connected to the side plates 34 of the cutter chassis. Bosses 42 form bearings for the end portion 44 of the shaft 46 supporting the rollers 38. The hanger 40 having upright portions 48 which are slotted at 50 to permit vertical up and down movement to regulate the height of cut. To enable the roller 38, upon adjustment in height of cut, to be disposed in a common ground contacting plane parallel to a horizontal, the plates 34 are slotted at 52 to permit angular adjustment of the hangers 40. Suitable bolts 54 and 56 function to clamp the hangers 40 in different positions of adjustment upon the side plates 34.

The amount the rollers 38 are spaced is, generally speaking, a matter of considerable latitude. In most cases it is advisable to sufficiently space the rollers to enable the cut grass to pass therebetween to avoid the forward conveying and accumulation of the cut grass back of the cutting reel. In view of the fact that ground irregularities are not uniform, in most cases the spacing of the rollers will be such as to give satisfactory dampening or smoothing out action over average ground. It should be readily understood that in passing over irregular ground that the support of the cutter chassis will shift back and forth between the rollers 38 to support the cutter chassis across the crests rather than to follow the abrupt raise and fall of the ground. By maintaining the same spacing between adjacent rollers and increase the number, it will be obvious that the leveling action will be increased. In practice, however, it is desirous to have the height of cut uniform and conforming to the contour of the ground as much as possible. Accordingly, the spacing of the rollers 38 and the number thereof should be reduced to the minimum capable of dampening the action of the cutter chassis to a point permitting the higher ground speeds desired.

Figure 4:
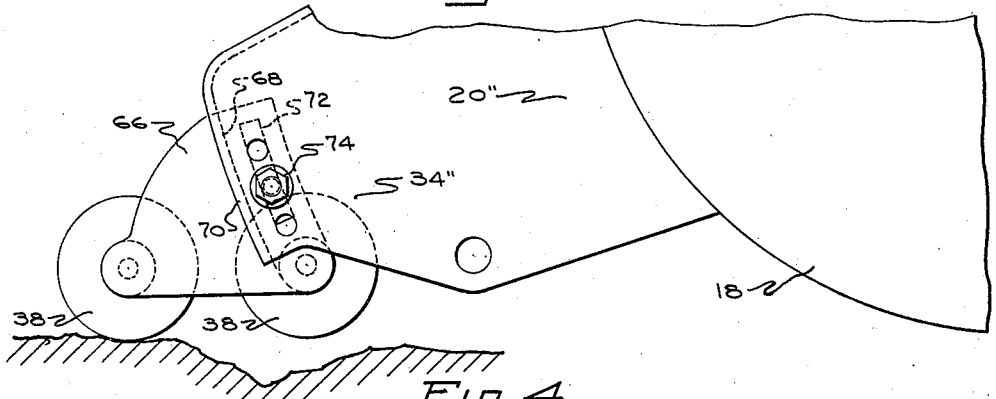
Figure 5:
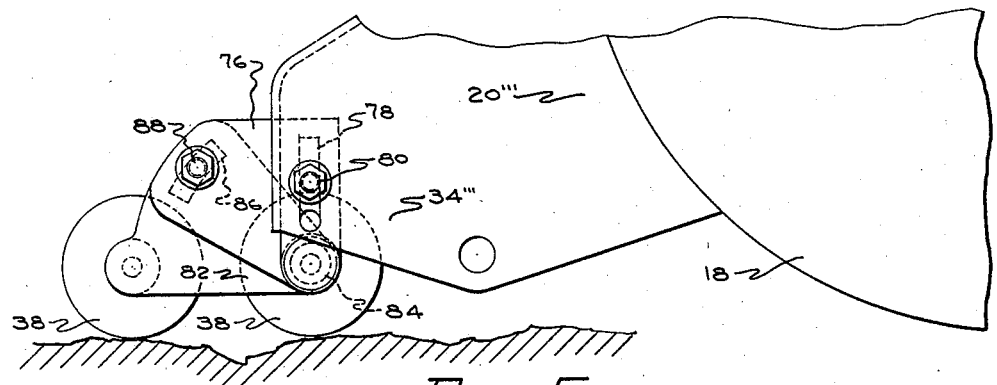

Referring to the modifications of Figs. 3 to 5 inclusive, in Fig. 3 the side plates 34' of the cutter chassis 20' are apertured at 58 to receive adjustment bolts 60 which are passed through slots 62 in the hanger 64 to support the rollers 38 in the manner shown in Fig. 2. By loosening the bolts 60, the hangers 64 may be individually adjusted to regulate the height of cut and to dispose the rollers 38 in a plane parallel to the horizontal. A similar result has been accomplished in the construction of Fig. 4 wherein the rollers 38 are mounted in common hangers 66 which have portions 68 describing the arc of a circle having the axis of rotation of the ground wheel 18 as the center. The portions 68 are guided along the turned in flanges 70 of the side plate 34'' of corresponding arcuate shape. Similar arcuate slots 72 are provided in the hangers 66 through which adjustment bolts 74 are passed to clamp the hangers 66 in different positions upon the plate 34''. The modification of Fig. 5 comprises two part hangers for the support and adjustment of the rollers 38. As illustrated, the hanger portions 76 support opposite ends of the front roller 38 for vertical adjustment through the arrangement of the slots 78 and the adjustment bolts 80. Opposite ends of the rear roller 38 are supported in the hanger portions 82 which have pivoted connections at 84 with the portions 76. Slots 86 and bolts 88 enable the portions 82 to be clamped in different angular positions to locate the rollers 38 in a plane parallel to the horizontal upon vertical adjustment of the portions 76.

The foregoing described and illustrated embodiments are only for the purpose of demonstrating the principles of the present invention. It is not my desire to be limited to any one of the forms disclosed, but I wish to include as part of my invention all ground contacting mechanism controlling the height of cut in lawn mowers, which levels or smooths out the ground irregularities enabling an increase in ground speed, and falls within the scope of the annexed claims.

In Fig. 6 I have shown an adapter bracket 90 supporting a ground roller 38'' for adjustment through manipulation of the bolt 92 operating in the slot 94 of the adjustment hanger 96. This construction is primarily designed to enable the attachment of an additional ground roller to lawn mower constructions now in use.

Having described my invention, what I desire to protect by Letters Patent and claim is:

1. A lawn mower comprising a chassis adapted to be moved in cutting travel, cutting means in the middle of the chassis, carrying wheels at one end of the chassis, and a pair of supporting rollers at the opposite end of the chassis spaced apart in the direction of travel and fixedly positioned with the ground engaging portions thereof in a common plane with the ground engaging portion of the carrying wheels.

2. With a lawn mower having ground engaging carrying wheels, a cutter chassis having cutting mechanism thereon pivotally mounted on said wheels, structure for supporting said chassis at its swinging end in its movement over the ground and regulating the height of the cut, said structure comprising at least two adjacent rollers spaced apart in the direction of mower travel and disposed in substantially the same ground engaging plane, and means fixedly mounting said rollers to remain and travel in said plane and adjustable to regulate the height of the cut and to maintain the plane of the contacting faces of said rollers parallel to the ground.

3. In a lawn mower having ground wheels and a cutter chassis pivotally supported by said wheels and with cutting mechanism carried by said chassis at a location spaced from the support, a pair of ground engaging rollers spaced apart in the direction of mower travel and revoluble on axes substantially parallel with the axis of rotation of the ground wheels, and an adjustable connection between said rollers and the swinging end of said cutter chassis away from the point of support thereof and consequently on the opposite side of the cutting mechanism, said adjustable connection fixedly mounting said rollers with the ground contacting portions thereof in a plane substantially tangential to the periphery of said ground wheels.

4. A roller structure for use with a lawn mower having a chassis carried at one end by ground engaging wheels and at the other end by a roller and having cutting mechanism disposed therebetween, a second ground engaging roller, and means mounting said second ground engaging roller upon the chassis adjacent to and spaced in the direction of mower travel from the lawn mower roller, said mounting means fixedly holding said second roller in a ground engaging plane with the ground engaging portions of the carrying wheels and the roller of the lawn mower.

5. A lawn mower having a chassis mounted for cutting traveling movement at one end in the direction of travel on carrying wheels and at the opposite end on supporting structure and having cutting means carried intermediate said ends, said supporting structure comprising at least two elongated transversely extending ground engaging members disposed in spaced relation in the direction of travel and means holding said members when in use fixedly positioned against movement relative to the chassis and with the ground engaging portions thereof in a single plane with the ground engaging portions of the carrying wheels.

6. A lawn mower having a chassis mounted for cutting traveling movement at one end in the direction of travel on carrying wheels and at the opposite end on supporting structure and having cutting means carried intermediate said ends, said supporting structure comprising at least two elongated transversely extending ground engaging members disposed in spaced relation in the direction of travel and means holding said members when in use fixedly positioned against movement relative to the chassis and with the ground engaging portions thereof in a single plane with the ground engaging portions of the carrying wheels, said holding means including means for raising and lowering the end of the chassis carried by said supporting structure and consequently varying the height of cut of the cutting means and at the same time maintaining the alignment of the several ground engaging portions in a single plane.

TRUMAN B. FUNK.